United States Patent
Khan et al.

(10) Patent No.: US 9,613,365 B2
(45) Date of Patent: *Apr. 4, 2017

(54) METHODS, SYSTEMS, AND COMPUTER READABLE MEDIA FOR SECURE NEAR FIELD COMMUNICATION OF A NON-SECURE MEMORY ELEMENT PAYLOAD

(71) Applicant: MasterCard International Incorporated, Purchase, NY (US)

(72) Inventors: Mohammad Khan, San Jose, CA (US); Philippe Martin, San Jose, CA (US); Pradeep Kumar, Fremont, CA (US); Jean-Christophe Raynon, San Jose, CA (US); Kaushik Roy, Foster City, CA (US); Roshan Vijayshankar, Santa Clara, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/752,527

(22) Filed: Jun. 26, 2015

(65) Prior Publication Data

US 2016/0012470 A1 Jan. 14, 2016

Related U.S. Application Data

(63) Continuation of application No. 13/232,736, filed on Sep. 14, 2011, now Pat. No. 9,071,963.
(Continued)

(51) Int. Cl.
*H04B 5/00* (2006.01)
*G06Q 30/02* (2012.01)
(Continued)

(52) U.S. Cl.
CPC ....... *G06Q 30/0238* (2013.01); *H04B 5/0031* (2013.01); *H04L 63/0492* (2013.01);
(Continued)

(58) Field of Classification Search
CPC ..... H04W 12/06; H04W 88/02; H04W 4/008; H04W 74/00; H04W 8/245;
(Continued)

(56) References Cited

U.S. PATENT DOCUMENTS

| 2004/0068472 A1* | 4/2004 | Sahota | ............... G06Q 20/10 705/64 |
| 2006/0059045 A1* | 3/2006 | Babbar | ............... G06Q 30/02 705/14.61 |

(Continued)

OTHER PUBLICATIONS

Notice of Allowance and Fee(s) Due for U.S. Appl. No. 13/232,736 (Mar. 6, 2015).
(Continued)

*Primary Examiner* — Golam Sorowar
(74) *Attorney, Agent, or Firm* — Jenkins, Wilson, Taylor & Hunt, P.A.

(57) ABSTRACT

According to one aspect, the subject matter described herein includes a method for secure near field communication (NFC) of a non-secure memory element payload. The method includes receiving, at an NFC enabled mobile device and from a content provider, a payload. The method also includes storing the received payload in a non-secure memory element of the NFC enabled mobile device. The method further includes transferring the stored payload from the non-secure memory element of the NFC enabled mobile device to a secure memory element of the NFC enabled mobile device, wherein transferring the stored payload includes loading the stored payload into a secure reloadable payload instance. The method further includes establishing a NFC link between the NFC enabled mobile device and an
(Continued)

NFC reader. The method further includes communicating, via the NFC link, the transferred payload from the secure reloadable payload instance to the NFC reader.

23 Claims, 5 Drawing Sheets

Related U.S. Application Data (60) Provisional application No. 61/382,726, filed on Sep. 14, 2010.

(51) Int. Cl.
*H04L 29/06* (2006.01)
*H04W 12/06* (2009.01)
*H04W 4/00* (2009.01)

(52) U.S. Cl.
CPC ......... *H04L 63/0823* (2013.01); *H04W 4/008* (2013.01); *H04W 12/06* (2013.01)

(58) Field of Classification Search
CPC . H04W 52/0254; H04W 76/02; H04W 12/08; H04W 4/001; H04W 4/14; H04W 4/206; H04W 72/082; H04W 84/18; H04W 8/26; H04L 63/0853; H04L 2209/805; H04L 63/04; H04L 63/0428; H04L 63/083; H04L 2463/102; H04L 45/00; H04L 45/54; H04L 9/0844; H04L 9/0894; H04L 9/3215; H04L 9/3226; H04L 9/3273; H04L 12/5895; H04M 1/7253; H04M 1/0274; H04M 1/72575; H04M 2250/04; H04M 17/103; H04M 17/106; H04M 1/675; H04M 1/72522; H04M 2017/12; H04M 2017/14; H04M 2250/12
See application file for complete search history.

(56) References Cited

U.S. PATENT DOCUMENTS

| | | | | |
|---|---|---|---|---|
| 2007/0180249 A1* | 8/2007 | Hatakeyama | ........... | G06F 21/10 713/176 |
| 2007/0258595 A1* | 11/2007 | Choy | .................... | H04L 9/0827 380/278 |
| 2008/0144650 A1* | 6/2008 | Boch | .................... | G06K 7/0008 370/464 |
| 2008/0155257 A1 | 6/2008 | Werner et al. | | |
| 2008/0168435 A1* | 7/2008 | Tupman | .................... | G06F 8/65 717/173 |
| 2008/0170699 A1* | 7/2008 | Fratti | .................... | H04W 12/02 380/278 |
| 2009/0063986 A1 | 3/2009 | Camenisch et al. | | |
| 2009/0222655 A1 | 9/2009 | Martinent et al. | | |
| 2009/0312011 A1* | 12/2009 | Huomo | ................ | G06K 7/0008 455/426.1 |
| 2010/0121766 A1 | 5/2010 | Sugaya et al. | | |
| 2011/0078081 A1 | 3/2011 | Pirzadeh et al. | | |
| 2012/0064828 A1 | 3/2012 | Khan et al. | | |

OTHER PUBLICATIONS

Applicant-Initiated Interview Summary for U.S. Appl. No. 13/232,736 (Feb. 10, 2015).
Non-Final Office Action for U.S. Appl. No. 13/232,736 (Oct. 17, 2014).
Applicant-Initiated Interview Summary for U.S. Appl. No. 13/232,736 (May 14, 2014).
Final Office Action for U.S. Appl. No. 13/232,736 (Mar. 4, 2014).
Non-Final Office Action for U.S. Appl. No. 13/232,736 (Oct. 17, 2013).
Communication of European publication number and information on the application of Article 67(3) EPC for European Application No. 11825874.8 (Jun. 26, 2013).
Notification of Transmittal of the International Search Report and the Written Opinion of the International Searching Authority, or the Declaration for International Application No. PCT/US2011/051598 (Apr. 18, 2012).
"Information technology—Telecommunications and information exchange between systems—Near Field Communciations—Interface and Protocol (NFCIP-1)," ISO/IEC 18092, pp. 1-66 (Apr. 1, 2004).
"Identification cards—Contactless integrated circuit(s) cards—Proximity cards—Part 2: Radio frequency power and signal interface," ISO/IEC 14443-2, pp. 1-10 (Jul. 22, 2003).
"Identification cards—Contactless integrated circuit(s) cards—Proximity cards—Part 4: Transmission protocol," ISO/IEC 14443-4, pp. 1-39 (Mar. 10, 2000).
"Identification cards—Contactless integrated circuit(s) cards—Proximity cards—Part 3: Initialization and anticollision," ISO/IEC 14443-3, pp. 1-48 (Jun. 11, 1999).

* cited by examiner

METHODS, SYSTEMS, AND COMPUTER READABLE MEDIA FOR SECURE NEAR FIELD COMMUNICATION OF A NON-SECURE MEMORY ELEMENT PAYLOAD

PRIORITY CLAIM

This application is a continuation of U.S. patent application Ser. No. 13/232,736, filed Sep. 14, 2011, which claims the benefit of U.S. Provisional Patent Application Ser. No. 61/382,726, filed Sep. 14, 2010; the disclosures of which are incorporated herein by reference in their entireties.

TECHNICAL FIELD

The subject matter described herein relates to utilizing a non-secure memory element to conduct secure near field communication (NFC) transactions. More specifically, the subject matter relates to methods, systems, and computer readable media for secure NFC of a non-secure memory element payload.

BACKGROUND

As NFC technology continues to evolve, NFC enabled devices are increasingly being utilized to conduct a wide array of consumer transactions. For example, consumers may utilize modern NFC enabled devices to make purchases, conduct financial transactions, and redeem coupons, gift cards, and rebates. From the standpoint of consumers, merchants, and application developers, it is often advantageous to conduct such transactions on a secure basis.

One limitation on conducting secure transactions, however, is the relatively small size of NFC enabled devices' secure memory element. This size limitation arises from the relatively high cost of the secured element as compared to non-secure elements of NFC enabled devices and limits the number of applications that may be provisioned to the secured element. Moreover, each additional application that is provisioned to the secured element of an NFC enabled device increases access to the secured element and may correspondingly decrease the level of security provided by the secured element. In contrast, non-secure elements of modern NFC enabled devices are relatively cheap and are readily available for provisioning by content providers. Currently, however, there is not a mechanism for securely communicating a non-secure memory element payload.

Accordingly, a need exists for methods, systems, and computer readable media for secure NFC of a non-secure memory element payload.

SUMMARY

According to one aspect, the subject matter described herein includes a method for secure NFC of a non-secure memory element payload. The method includes receiving, at an NFC enabled mobile device and from a content provider, a payload. The method also includes storing the received payload in a non-secure memory element of the NFC enabled mobile device. The method further includes transferring the stored payload from the non-secure memory element of the NFC enabled mobile device to a secure memory element of the NFC enabled mobile device, wherein transferring the stored payload includes loading the stored payload into a secure reloadable payload instance. The method further includes establishing a NFC link between the NFC enabled mobile device and an NFC reader. The method further includes communicating, via the NFC link, the transferred payload from the secure reloadable payload instance to the NFC reader.

According to another aspect, the subject matter described herein includes an NFC enabled mobile device for secure NFC of a non-secure memory element payload. The NFC enabled mobile device includes a non-secure memory element configured to store a payload received from a content provider. The NFC enabled mobile device also includes a payload management module configured to transfer the stored payload from the non-secure memory element of the NFC enabled mobile device to a secure memory element of the NFC enabled mobile device, wherein transferring the stored payload includes loading the stored payload into a secure reloadable payload instance. The NFC enabled mobile device further includes an NFC module configured to establish a NFC link between the NFC enabled mobile device and an NFC reader, and to communicate, via the NFC link, the transferred payload from the secure reloadable payload instance to the NFC reader.

As used herein, the term "module" refers to software in combination with hardware (such as a processor) and/or firmware for implementing features described herein.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
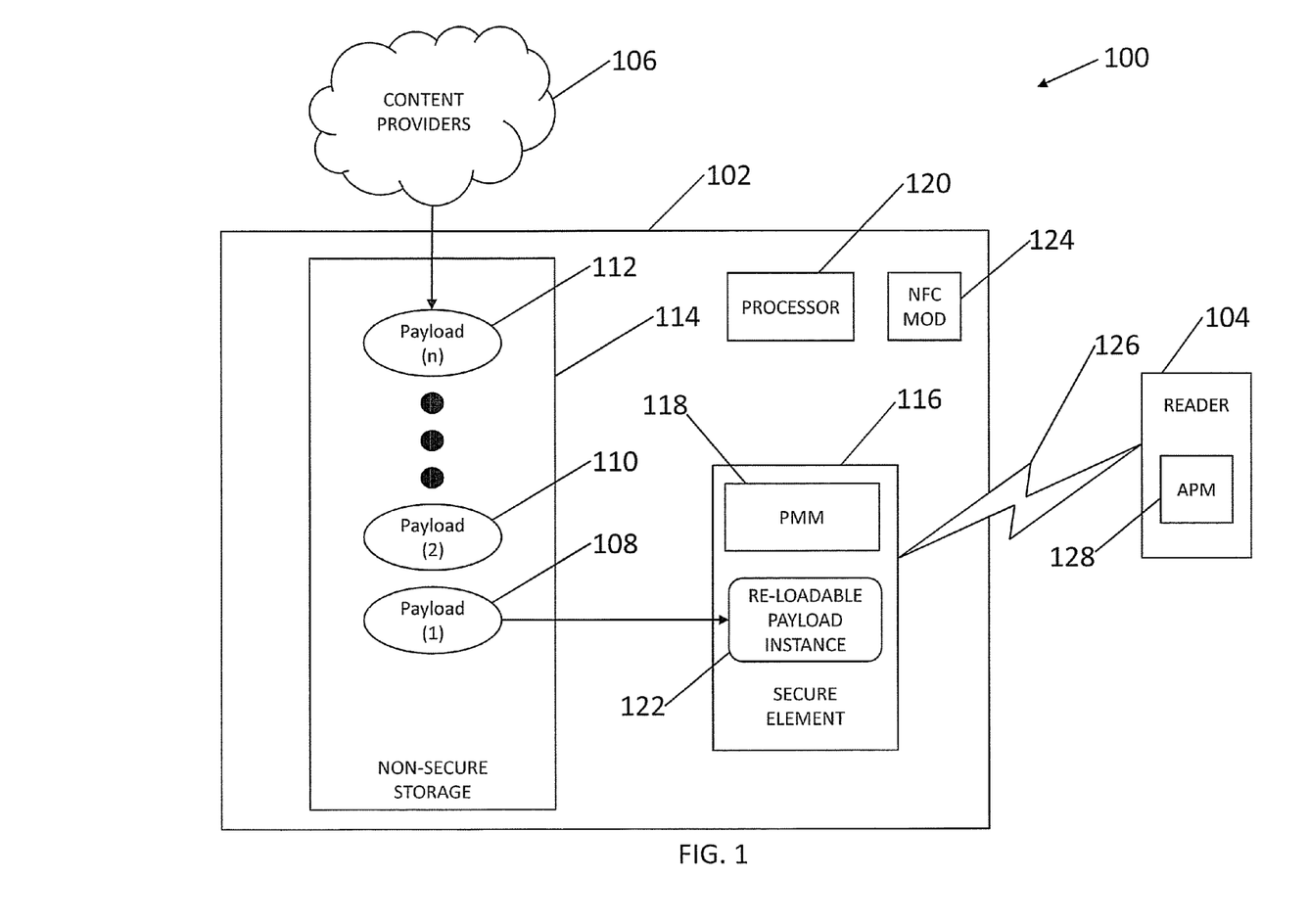
FIG. 1 is a block diagram of an exemplary system for NFC of a non-secure memory payload in accordance with embodiments of the subject matter described herein.

Methods, systems, and computer readable media for near field communication (NFC) of a non-secure memory payload are provided. FIG. 1 is a block diagram of an exemplary system for NFC of a non-secure memory payload in accordance with embodiments of the subject matter described herein. Referring to FIG. 1, system 100 may include NFC enabled mobile device 102. NFC enabled mobile device 102 may be any mobile device capable of NFC. For example, NFC enabled mobile device 102 may be a tablet computer, a smartphone, a personal digital assistant (PDA), or the like. System 100 may also include NFC reader 104. NFC reader 104 may be any device capable of utilizing NFC to securely communicate with one or more NFC enabled mobile devices, such as NFC enabled mobile device 102. System 100 may further include one or more content providers 106. In one embodiment, content providers 106 may include one or more servers or network elements that generate and distribute redeemable electronic certificates to one or more NFC enabled mobile devices, such as NFC enabled mobile device 102. For example, content providers 106 may generate and distribute electronic certificates in a softcard format, such as electronic coupon certificates, electronic prepaid cards, electronic loyalty cards, electronic gift cards, electronic credit cards, an electronic offer or deal, an electronic access card, an electronic healthcare card, an electronic ticket, and the like. Notably, the present subject matter may be utilized for a payment transaction, a non-payment transaction, or a combination of payment and non-payment transactions. One or more of content providers 106 may communicate such redeemable electronic certificates to NFC enabled mobile device 102 via one or more payloads. For example, one or more of content providers 106 may communicate payloads 108, 110, and 112 to NFC enabled mobile device 102. A payload may be any combination of digital data. For example, a payload may be one or more packets of digital data. In some embodiments, one or more content providers 106 may communicate one or more of payloads 108, 110, and 112 to NFC enabled mobile device 102 via an over the air (OTA) provisioning connection, such as a cellular Internet connection, a Wi-Fi Internet connection, or via any other mobile wireless network connection. For example, a user of NFC enabled mobile device 102 may download one or more of payloads 108, 110, and 112 from one or more of content providers 106 via a Wi-Fi Internet connection. In some embodiments, one or more of content providers 106 may communicate one or more of payloads 108, 110, and 112 to NFC enabled mobile device 102 via an NFC connection. For example, one or more of content providers 106 may communicate one or more of payloads 108, 110, and 112 to NFC enabled mobile device 102 via an NFC connection during a point of sale (POS) transaction. In some embodiments, one or more of payloads 108, 110, and 112 may include a header containing information that identifies the one or more of content providers 106 that are associated with the one or more of payloads 108, 110, and 112. For example, the header information may detail what trusted party, subdomain, issuer, or any other third party content provider the payload is associated with or originated from.

NFC enabled mobile device 102 may include non-secure memory element 114. In some embodiments, non-secure memory element 114 may include baseband memory of NFC enabled mobile device 102. NFC enabled mobile device 102 may also include secure memory element 116. A user of NFC enabled mobile device 102, one or more of content providers 106, and/or a developer of an application associated with NFC enabled mobile device 102 may desire for a transaction conducted by NFC enabled mobile device 102 to be performed on a secure basis. Conducting such a transaction on a secure basis may require that a redeemable electronic certificate associated with such a transaction be located in secure memory element 116. However, due to the limited size of secure memory element 116, the high frequency of desired secured transactions and the resource consumption associated with storing their corresponding redeemable electronic certificates, and security concerns associated with access to secured element 116, it may be more feasible for one or more of content providers 106 to provision one or more of payloads 108, 110, and 112 to non-secure memory element 114. In accordance with embodiments of the subject matter described herein, a payload (e.g., payload 108) provisioned to non-secure memory element 114 may be securely communicated to NFC reader 104 via NFC. In some embodiments, the transaction being conducted may either be at least one of a payment transaction (e.g., an electronic credit card transaction) and/or a non-payment transaction (e.g., redeeming an electronic ticket).

In accordance with embodiments of the subject matter described herein, NFC enabled mobile device 102 may include payload management module (PMM) 118. PMM 118 may be an application downloaded from a trusted source by NFC enabled mobile device 102 and may be stored in secure memory element 116. As used herein, a trusted source may include a service provider that is a Trusted Service Manager (TSM) of reliable data. A TSM may communicate programs or data that are trustworthy through a secured and encrypted communication channel that is established between secure element 116 (or any other secured chip) in the mobile device and the service provider. Security may be established through secret keys that are shared between the secure element 116 and the TSM, or through some other cryptographic scheme that allows both endpoints to authenticate each other and communicate data through an encrypted/secured channel. In one embodiment, PMM 118 is responsible for the authentication of content providers 106 and performs the authentication process before any data is loaded from the non-secure memory storage 114 into secure element 122. For example, this authentication process may involve validating a digital signature or authentication code in the content payload which is associated with the provider of the content.

Secure element 116 in NFC enabled mobile device 102 may include any high security memory area that may be provisioned in a subscriber identity module (SIM) card, embedded memory, or added on (e.g., a MicroSD memory card). Similarly, secure element 116 may include other forms of secured memory, such as memory included in the main processor itself (e.g., "Trust Zone"). As used herein, the terms "secure element", "secure memory", and "secure memory" element includes one or more of the aforementioned forms of secured memory embodiments.

NFC enabled mobile device 102 may include processor 120. In one embodiment, processor 120 is a hardware based processing unit which may be configured to run (i.e., execute) PMM 118. Upon execution, PMM 118 may be configured to create secure reloadable payload instance 122. NFC enabled mobile device 102 may also include NFC module 124, which may be configured to establish NFC link 126 between NFC enabled mobile device 102 and NFC reader 104. In one embodiment, NFC module 124 may comprise a hardware based circuit. In some embodiments, the NFC link 126 established by NFC module 124 may be secure or unsecure. From the perspective of NFC reader 104, secure reloadable payload instance 122 may appear as a conventional secure payload that contains a redeemable electronic certificate. In accordance with embodiments of the subject matter described herein, however, PMM module 118 may be configured to transfer one or more of payloads 108, 110, and 112 from non-secure memory element 114 to secure memory element 116 by loading the one or more of payloads 108, 110, and 112 into secure reloadable payload instance 122, thereby enabling NFC module 124 to securely communicate the one or more of payloads 108, 110, and 112 to NFC reader 104 via NFC link 126. The one or more of payloads 108, 110, and 112 may include a corresponding one or more application identifiers (AIDs) which may be associated with applications (e.g., electronic certificates and softcards) contained within the one or more of payloads 108, 110, and 112. NFC reader 104 may include AIDs processing module (APM) 128 which may be configured to identify and utilize the one or more AIDs contained within the one or more of payloads 108, 110, and 112 to identify one or more applications required to select and process the data contained within the one or more of payloads 108, 110, and 112.

In one embodiment, the reloadable payload instance 122 is an application running in a secured memory and processor environment (e.g., secure element 116) and receives inputs such as payload data, encryption flag with a key index for encryption (i.e., encryption key), an authentication flag with a key index for authentication (i.e., authentication key), application identifiers (AIDs), and protocol identifiers. The reloadable payload instance 122 may output authenticated and decrypted payload data that may be used to conduct a wireless transaction. In one embodiment, reloadable payload instance 122 may also be configured to accept a plurality of different payload data types (e.g., electronic coupons, loyalty cards, gift cards, etc.) from the non-secure memory storage and transfer the plurality of payloads to an NFC reader thru a single transaction (i.e., a single tap). The reloadable payload instance may also be configured to perform an auto selection of payload data thru interaction between the NFC enabled mobile device and the NFC reader.

Figure 2:
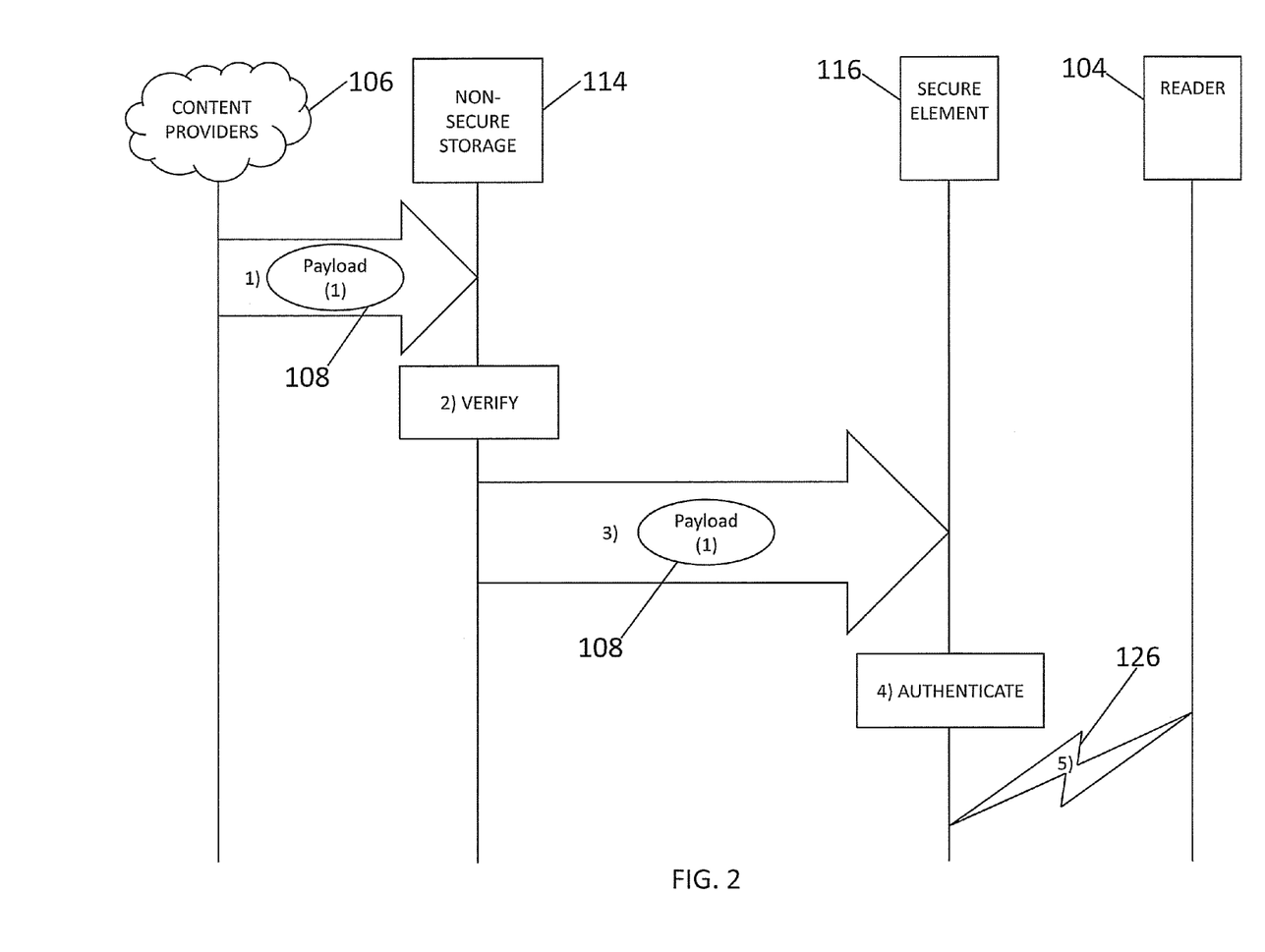
FIG. 2 is a message flow diagram illustrating an exemplary message sequence for NFC of a non-secure memory payload in accordance with embodiments of the subject matter described herein.

FIG. 2 is a message flow diagram illustrating an exemplary message sequence for NFC of a non-secure memory payload in accordance with embodiments of the subject matter described herein. Although FIG. 2 only depicts a single payload being processed, multiple payloads may be processed without departing from the scope of the present subject matter. Referring to FIG. 2, at step 1, a content provider 106 may communicate payload 108 to NFC enabled mobile device 102. In one embodiment, NFC enabled mobile device 102 receives the payload from the content provider via an over the air (OTA) provisioning server/channel or an over the Internet (OTI) provisioning server/channel. Payload 108 may, for example, include a redeemable electronic certificate, such as an electronic coupon certificate. NFC enabled mobile device 102 may receive payload 108 and may store payload 108 in non-secure memory element 114. In one embodiment, the payload 108 may be in a clear data form or in an encrypted form. For example, payload 108 may be stored in non-secure memory element 114 in encrypted form (i.e., payload 108 may be encrypted by a content provider 106, a TSM or service provider before payload 108 is provisioned into non-secure memory using a "payload" key that also resides in the secure element). Content provider 106 may also provision a "payload" key corresponding to the encrypted data in the secure element 116. The payload key may be used by content provider 106 to encrypt the payload data and to create an authentication code to be included with the payload. The payload key may also be provisioned to the secure element of an NFC enabled mobile device in order to later decrypt the encrypted payload and/or to validate the authentication code included in the payload.

Prior to step 2, a user of NFC enabled mobile device 102 may desire to redeem the electronic coupon certificate contained within payload 108 and may select (e.g., via a screen display of device 102) the electronic coupon certificate contained within payload 108 for redemption. For example, the electronic coupon certificate contained within payload 108 may be related to a product that the user of NFC enabled mobile device 102 is in the process of purchasing and as part of the purchase transaction the user of NFC enabled mobile device 102 may select the electronic coupon certificate contained within payload 108 for redemption.

At step 2, PMM 118 may verify that payload 108 is from an authorized content provider, such as one or more of content providers 106. In one embodiment, PMM 108 may confirm an authentication code associated with payload 108 and/or the content provider 106 that provisioned payload 108. Various methods and mechanisms may be used to conduct the authentication process, such as utilizing a shared secret key method, a public key cryptographic method, digital certifications, and the like. In order to provide a high level of security for the authentication process, a secret or public cryptographic key may be reside in secure element, secure memory, or any other highly secured memory. Alternatively, the authentication method may involve one or more various software camouflage techniques.

In one embodiment, payload 108 may include a digital signature, authentication code, or authorization code that can be checked (i.e., validated) against a value, which is associated with one or more of content providers 106, stored in secure element 116. The value stored in the secure element may be a cryptographic value and may be derived by or embodied as a payload key previously provisioned by content provider 106. In one embodiment, the digital signature or authentication code that authenticates the source that generated the content as well as the content itself may be derived as a function of the content provider, content data and a payload key (e.g., encryption key).

In accordance with embodiments of the subject matter described herein, at step 3, PMM 118 initiates the transfer of payload 108 in encrypted form from non-secure memory element 114 to secure memory element 116. For example, PMM 118 may transfer encrypted payload 108 from non-secure memory element 114 to secure memory element 116 for preparing the payload 108 to be loaded into secure reloadable payload instance 122. Similarly, encrypted payload 108 may be decrypted using key(s) residing in the secure element 116 (e.g., payload key previously provisioned in the secure element) prior to loading into the reloadable payload instance. Secure reloadable payload instance 122 may be any data structure that will be decrypted using the secure element based key(s) which then allows payload 108 to appear as a conventional secure payload for secure NFC to an NFC reader, such as NFC reader 104. For example, reloadable payload instance 122 is capable of being loaded with a first payload from a non-secure memory element (e.g., non-secure memory element 114) which can then be securely communicated via secure NFC. After the transaction is completed (or after the data is read by the NFC reader), reloadable payload instance 122 may be cleared of the loaded payload. Similarly, reloadable payload instance 122 may be cleared upon being reloaded with a subsequent second payload from the non-secure memory element. In one embodiment, multiple payloads (e.g., payloads 108, 110, and 112) selected by the user for a single transaction may be authenticated and/or decrypted into reloadable payload instance 122.

At step 4, PMM 118 may utilize a payload key stored in secure memory element 116 and associated with a TSM or one or more of content providers 106 to authenticate the data (e.g., the electronic coupon certificate) contained in payload 108. In some embodiments, the electronic coupon certificate contained in payload 108 may be encrypted, for example, via the triple data encryption algorithm (TDEA) or some other shared key or public cryptographic method. In one embodiment, PMM 118 may utilize the same key or a different key stored in secure memory element 116 to decrypt the data (e.g., electronic coupon certificate) contained in payload 108 prior to the being loaded into the reloadable payload instance. In one embodiment, mobile device 102 may be configured to authenticate the payload using an authentication code attached to the payload. The payload may also be authenticated through the successful decryption of payload 108 in order to detect possible fraud, such as unlawful electronic coupon duplication. In an alternate embodiment, the payload data may be directly loaded into reloadable payload instance 122 for communication with an NFC reader (via either card emulation mode or peer to peer mode) without decryption. In one embodiment, the authentication code or digital signature in the payload data is verified to authenticate the content provider prior to being loaded into the reloadable payload instance.

In one embodiment, various authentication methods may be used to authenticate the payload data depending on the level of desired security. For example, for high level security data, payload data may include encrypted data and an authentication code based on a payload key provisioned in the secure element. Mid-level security may involve a payload that includes payload data that is not encrypted, but may still include the provisioning of the authentication code based on the payload key in the secure element. Low level security may involve the storing of encryption key(s) (e.g., payload keys) and authentication key(s) in the baseband memory instead of the secure element.

In one embodiment, a TSM (e.g., a content provider 106) may provide any of the above levels of security for various applications. For example, a TSM may OTA provision its encryption key (e.g., payload key) and/or authentication key in the secure element. The TSM then uses one or more of these keys to encrypt the data and/or create an authentication code to be included in the payload before OTA provisioning the payload for storage in non-secured memory 114. At the time of selecting the payload (e.g., an electronic coupon), the payload data is sent to the secure element. The secure element based application decrypts the payload data with the previously provisioned payload key(s) and/or confirms the authentication code using the payload key(s) residing in the secure element of the NFC enabled mobile device.

At step 5, NFC module 124 may establish an NFC link 126 between NFC enabled mobile device 102 and NFC reader 104, and may communicate payload 108 from secure reloadable payload instance 122 to NFC reader 104 via NFC link 126. NFC link 126 may be a secure wireless link or an unsecure wireless link. In one embodiment, NFC link 126 may be established using a card emulation mode (e.g., in accordance with ISO 14443) or a peer to peer mode (e.g. in accordance with ISO 18092) of communication. Similarly, payload 108 may be communicated via NFC link 126 in encrypted or clear form. In one embodiment, multiple payloads (e.g., payloads 108, 110, and 112) selected by the user for a single transaction may be transferred from reloadable payload instance 122 to NFC reader 104 via NFC link 126 after a single tap. In some embodiments, NFC module 124 may set a proximity payment system environment (PPSE) of NFC enabled mobile device 102 to an application identifier associated with reloadable payload instance 122, which may vary based on the content of the loaded payload. For example, NFC module 124 may set a PPSE of NFC enabled mobile device 102 to an application identifier associated with payload 108 (e.g., an application identifier that corresponds to an application for redeeming the electronic coupon certificate contained in payload 108). In some embodiments, PMM 118 may be configured to clear secure reloadable payload instance 122 of payload 108, after payload 108 has been communicated from secure reloadable payload instance 122 to NFC reader 104, to free secure reloadable payload instance 122 so that PMM 118 may load a future payload from non-secure memory element 114, for example payload 110, into secure reloadable payload instance 122.

Figure 3A:
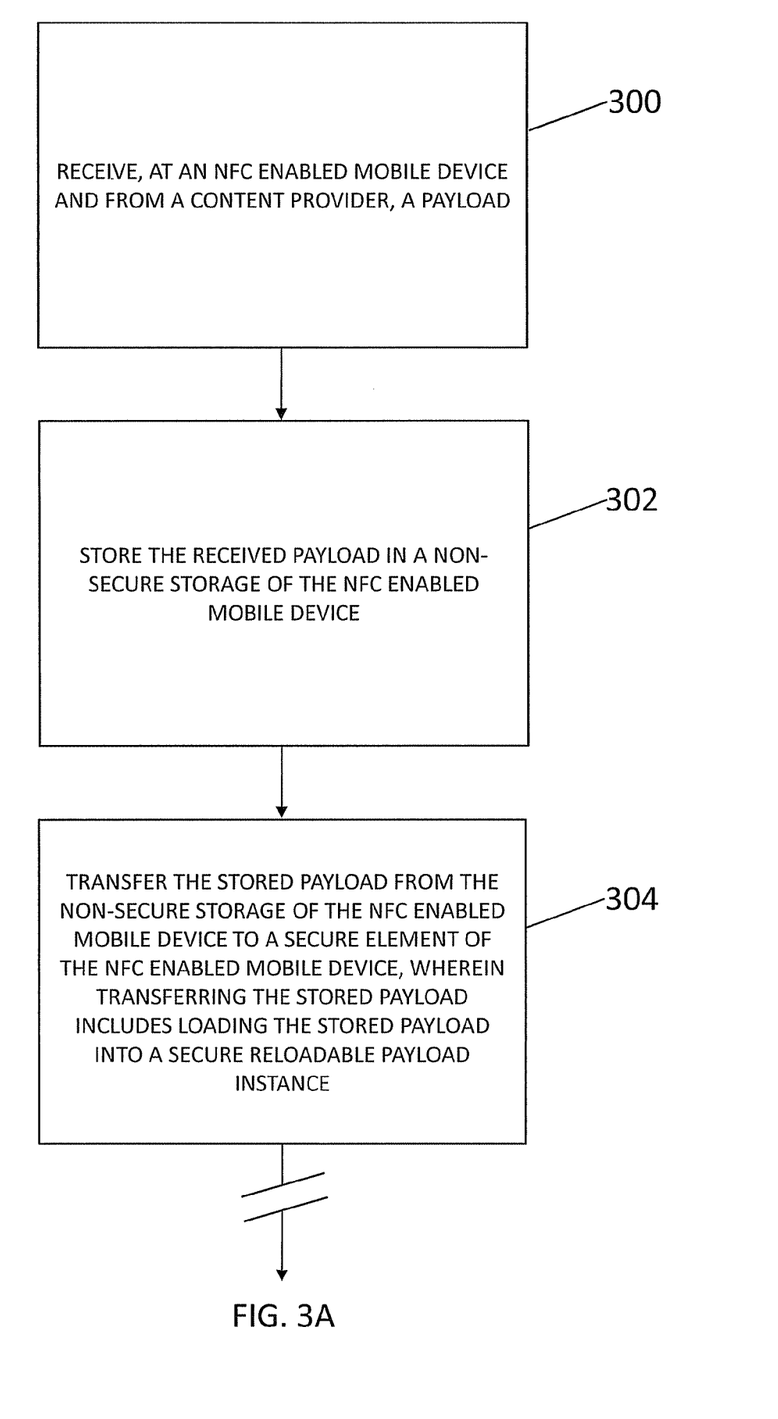
FIGS. 3A and 3B are respectively a first and second portion of a flow chart illustrating an exemplary process for NFC of a non-secure memory payload in accordance with embodiments of the subject matter described herein.
Figure 3B:
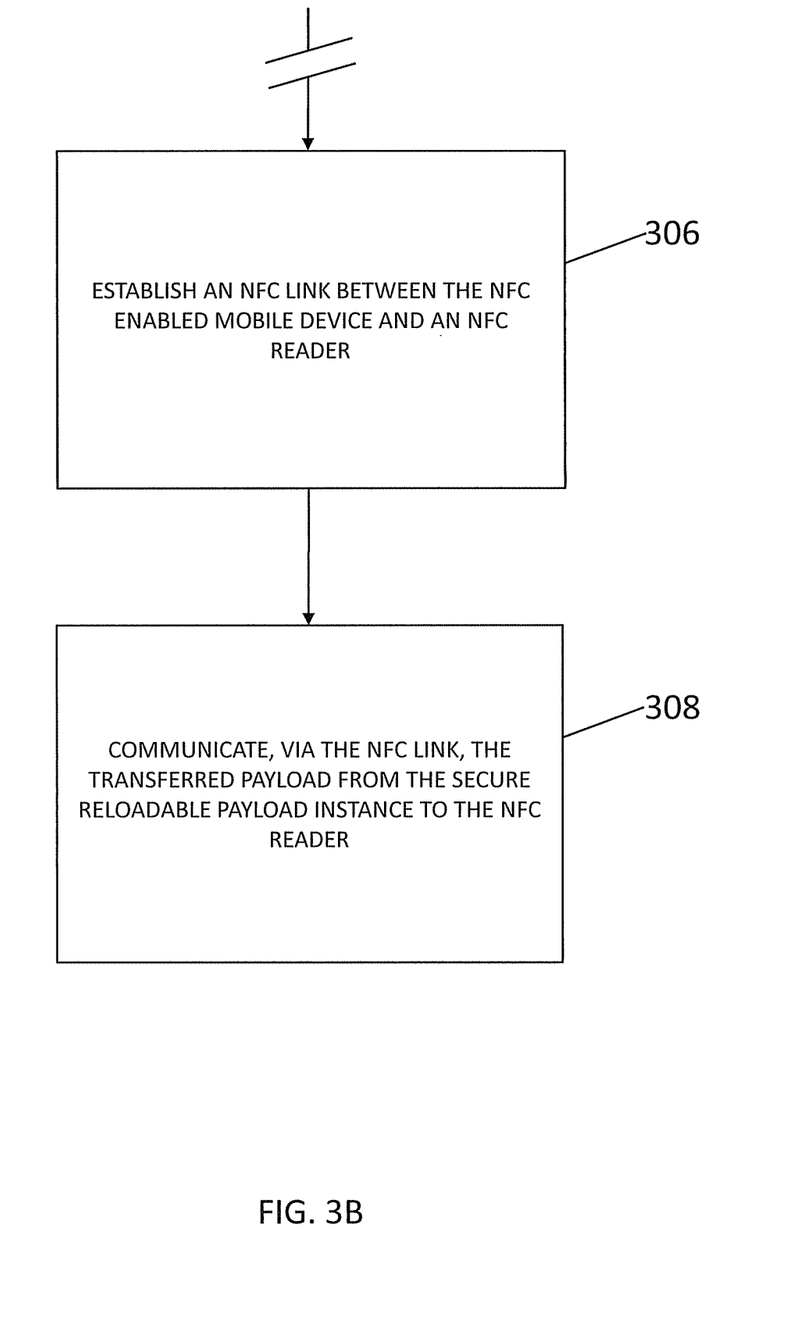

FIGS. 3A and 3B are respectively a first and second portion of a flow chart illustrating an exemplary process for NFC of a non-secure memory payload in accordance with embodiments of the subject matter described herein. Referring to FIG. 3A, in step 300, a payload is received at an NFC enabled mobile device from a content provider. For example, payload 108 may be received at NFC enabled mobile device 102 from one or more of content providers 106. In step 302, the received payload is stored in a non-secure memory element of the NFC enabled mobile device. For example, payload 108 may be stored in non-secure memory element 114 of NFC enabled mobile device 102. In step 304, the stored payload is transferred from the non-secure memory element of the NFC enabled mobile device to a secure memory element of the NFC enabled mobile device, wherein transferring the stored payload includes loading the stored payload into a secure reloadable payload instance. For example, payload 108 may be loaded into secure reloadable payload instance 122 and transferred from non-secure memory element 114 of NFC enabled mobile device 102 to secure memory element 116 of NFC enabled mobile device 102. Referring to FIG. 3B, in step 306, a NFC link is established between the NFC enabled mobile device and an NFC reader. For example, NFC link 126 may be established between NFC enabled mobile device 102 and NFC reader 104. In step 308, the transferred payload is communicated from the secure reloadable payload instance to the NFC reader via the NFC link. For example, payload 108 may be communicated from secure reloadable payload instance 122 to NFC reader 104 via NFC link 126.

Figure 4:
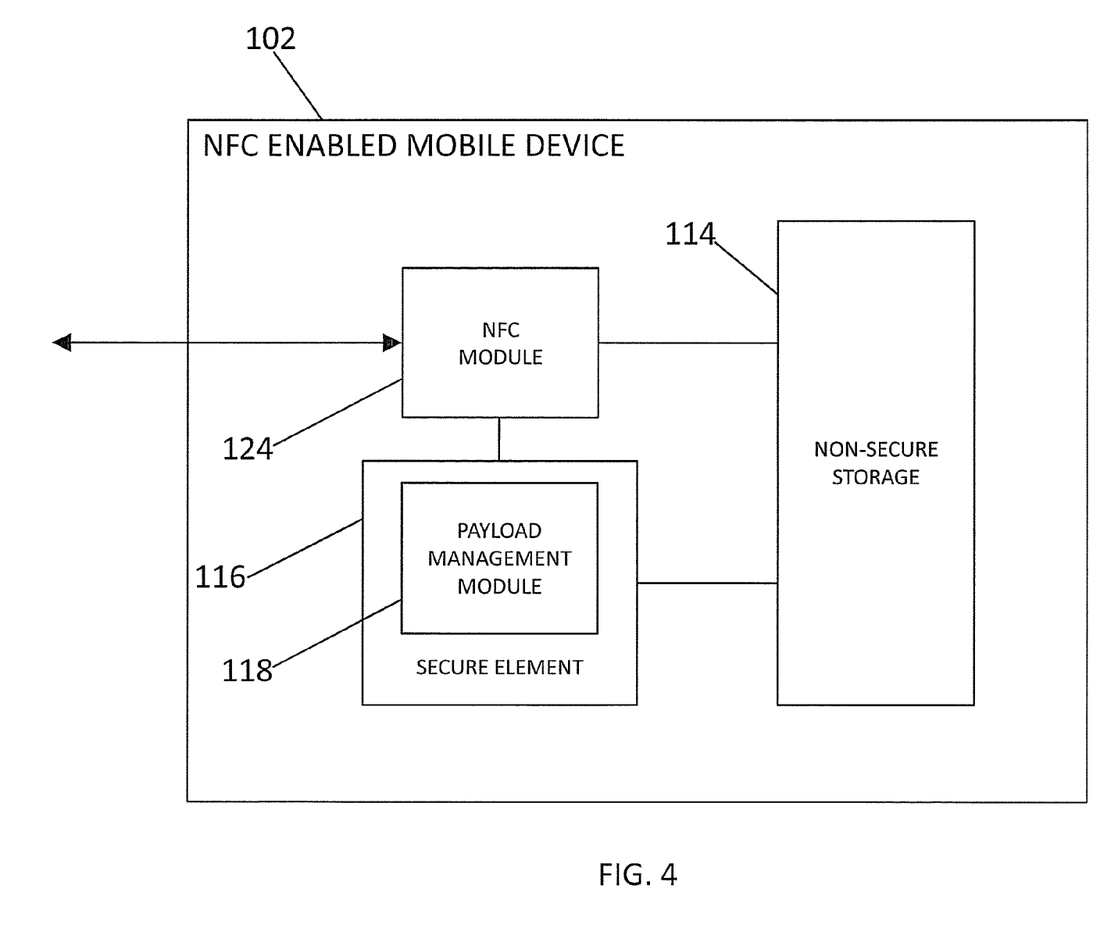
FIG. 4 is a block diagram illustrating an NFC enabled mobile device for NFC of a non-secure memory payload in accordance with embodiments of the subject matter described herein.

FIG. 4 is a block diagram illustrating an NFC enabled mobile device for NFC of a non-secure memory payload in accordance with embodiments of the subject matter described herein. Referring to FIG. 4, NFC enabled mobile device 102 may include a non-secure memory element configured to store a payload received from a content provider. For example, NFC enabled mobile device 102 may include non-secure storage element 114 which may be configured to store a payload (e.g., payload 108 as shown in FIG. 1) received from one or more of content providers (e.g., content providers 106 as shown in FIG. 1) NFC enabled mobile device 102 may also include a payload management module (PMM) configured to transfer the stored payload from the non-secure memory element of NFC enabled mobile device 102 to a secure memory element of NFC enabled mobile device 102, wherein transferring the stored payload includes loading the stored payload into a secure reloadable payload instance. For example, NFC enabled mobile device 102 may include PMM 118 which configured to transfer a payload from non-secure storage element 114 of NFC enabled mobile device 102 to secure element 116 of NFC enabled mobile device 102, wherein transferring payload 108 includes loading payload 108 into secure reloadable payload instance 122. NFC enabled mobile device 102 may further include an NFC module configured to establish a NFC link between NFC enabled mobile device 102 and an NFC reader, and to communicate, via the NFC link, the transferred payload from the secure reloadable payload instance to the NFC reader. For example, NFC enabled mobile device 102 may include NFC module 124 which may be configured to establish NFC link 126 between NFC enabled mobile device 102 and NFC reader 104, and may further be configured to communicate, via NFC link 126, payload 108 from secure reloadable payload instance 122 to NFC reader 104.

In one embodiment, the same process described above may be reversed. For example, if an electronic coupon or any other content data type is to be loaded from NFC Reader 104 to the non-secure baseband memory, the reverse process may occur. Namely, NFC reader 104 may load the data into the Reloadable Payload Instance. After encrypting the data with the associated payload key, the payload is then stored into the non-secure baseband memory.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for secure near field communication (NFC) of a non-secure memory element payload, the method comprising:
   receiving, at an NFC enabled mobile device and from a content provider, a payload that is encrypted;
   storing the received payload in a non-secure memory element located within the NFC enabled mobile device;
   transferring the stored payload from the non-secure memory element located within the NFC enabled mobile device to a secure memory element located within the NFC enabled mobile device, wherein transferring the stored payload includes utilizing a payload key provisioned into the secure memory element by the content provider to decrypt the stored payload and subsequently loading the stored payload into a secure reloadable payload instance included in the secure memory element located within the NFC enabled mobile device;
   establishing a NFC link between the NFC enabled mobile device and an NFC reader;
   communicating, via the NFC link, the transferred payload from the secure reloadable payload instance to the NFC reader; and
   after communicating the transferred payload from the secure reloadable payload instance to the NFC reader, clearing the transferred payload from the secure reloadable payload instance and reloading the secure reloadable payload instance with a subsequent second payload from the non-secure memory element.

2. The method of claim 1 comprising verifying the stored payload, wherein verifying the stored payload includes validating a digital signature, authentication code, or authorization code within the stored payload against a value stored in the secure memory element of the NFC enabled mobile device and associated with the content provider.

3. The method of claim 1 wherein the received payload comprises a header containing information that identifies the content provider.

4. The method of claim 1 wherein the received payload is received via NFC.

5. The method of claim 1 wherein the received payload comprises a redeemable electronic certificate.

6. The method of claim 5 wherein the redeemable electronic certificate comprises at least one of an electronic coupon certificate, an electronic offer, an electronic prepaid card, an electronic loyalty card, an electronic access card, an electronic healthcare card, and an electronic ticket.

7. The method of claim 5 comprising selecting, by a user of the NFC enabled mobile device, the redeemable electronic certificate.

8. The method of claim 1 wherein the non-secure memory element of the NFC enabled mobile device comprises baseband memory.

9. The method of claim 1 wherein the secure reloadable payload instance is created by an application stored in the secure memory element of the NFC enabled mobile device and downloaded from a trusted source.

10. The method of claim 9 comprising utilizing a key provisioned with the application stored in the secure memory element and associated with the content provider to authenticate an electronic certificate contained in the transferred payload.

11. The method of claim 1 comprising setting a proximity payment system environment (PPSE) of the NFC enabled mobile device with an application identifier associated with the secure reloadable payload instance.

12. A near field communication (NFC) enabled mobile device for secure NFC of a non-secure memory element payload, the NFC enabled mobile device comprising:
    a non-secure memory element located within a NFC enabled mobile device configured to store a payload received from a content provider, wherein the payload is encrypted;
    a payload management module configured to transfer the stored payload from the non-secure memory element located within the NFC enabled mobile device to a secure memory element located within the NFC enabled mobile device, wherein transferring the stored payload includes utilizing a payload key provisioned into the secure memory element by the content provider to decrypt the stored payload and subsequently loading the stored payload into a secure reloadable payload instance included in the secure memory element located within the NFC enabled mobile device; and
    an NFC module configured to establish a NFC link between the NFC enabled mobile device and an NFC reader, and to communicate, via the NFC link, the transferred payload from the secure reloadable payload instance to the NFC reader,
    wherein after the NFC module communicates the transferred payload from the secure reloadable payload instance to the NFC reader, the payload manage module is configured to clear the transferred payload from the secure reloadable payload instance and reloading the secure reloadable payload instance with a subsequent second payload from the non-secure memory element.

13. The system of claim 12 wherein the payload management module is configured to verify the stored payload, wherein verifying the stored payload includes validating a digital signature, authentication code or authorization code within the stored payload against a value stored in the secure memory element of the NFC enabled mobile device and associated with the content provider.

14. The system of claim 12 wherein the received payload comprises a header containing information that identifies the content provider.

15. The system of claim 12 wherein the received payload is received via NFC.

16. The system of claim 12 wherein the received payload comprises a redeemable electronic certificate.

17. The system of claim 16 wherein the redeemable electronic certificate comprises at least one of an electronic coupon certificate, an electronic offer, an electronic prepaid card, an electronic loyalty card, an electronic access card, an electronic healthcare card, and an electronic ticket.

18. The system of claim 16 comprising selecting, by a user of the NFC enabled mobile device, the redeemable electronic certificate.

19. The system of claim 12 wherein the non-secure memory element of the NFC enabled mobile device comprises baseband memory.

20. The system of claim 12 wherein the secure reloadable payload instance is created by an application stored in the secure memory element of the NFC enabled mobile device and downloaded from a trusted source.

21. The system of claim 20 wherein the payload management module is configured to utilize a key provisioned with the application stored in the secure memory element and associated with the content provider to authenticate an electronic certificate contained in the transferred payload.

22. The system of claim 12 wherein the NFC module is configured to set a proximity payment system environment (PPSE) of the NFC enabled mobile device with an application identifier associated with the secure reloadable payload instance.

23. A non-transitory computer readable medium comprising computer executable instructions that when executed by a processor of a computer control the computer to perform steps comprising:

receiving, at an NFC enabled mobile device and from a content provider, a payload that is encrypted;

storing the received payload in a non-secure memory element located within the NFC enabled mobile device;

transferring the stored payload from the non-secure memory element located within the NFC enabled mobile device to a secure memory element located within the NFC enabled mobile device, wherein transferring the stored payload includes utilizing a payload key provisioned into the secure memory element by the content provider to decrypt the stored payload and subsequently loading the stored payload into a secure reloadable payload instance included in the secure memory element located within the NFC enabled mobile device;

establishing a NFC link between the NFC enabled mobile device and an NFC reader;

communicating, via the NFC link, the transferred payload from the secure reloadable payload instance to the NFC reader; and after communicating the transferred payload from the secure reloadable payload instance to the NFC reader, clearing the transferred payload from the secure reloadable payload instance and reloading the secure reloadable payload instance with a subsequent second payload from the non-secure memory element.

* * * * *